United States Patent [19]
Del Rosario

[11] Patent Number: 5,353,746
[45] Date of Patent: Oct. 11, 1994

[54] AQUARIUM WITH LIGHT FIXTURE ISOLATED FROM TANK

[76] Inventor: Luis Del Rosario, 4524 Brazil St., Los Angeles, Calif. 90039

[21] Appl. No.: 63,877

[22] Filed: May 18, 1993

[51] Int. Cl.$^5$ .............................................. A01K 63/00
[52] U.S. Cl. .................................................. 119/266
[58] Field of Search ............... 119/265, 266, 267, 269, 119/245

[56] References Cited

U.S. PATENT DOCUMENTS 3,125,065  3/1964  Willinger ............................. 119/266
3,805,740  4/1974  Hall ..................................... 119/266

FOREIGN PATENT DOCUMENTS 2731363  1/1979  Fed. Rep. of Germany ...... 119/266
1185420  3/1970  United Kingdom ................ 119/266

Primary Examiner—Thomas Price
Attorney, Agent, or Firm—Wagner & Middlebrook

[57] ABSTRACT

An aquarium includes a tank with a canopy forming a top for the tank. A well is formed in the canopy with a ledge and a hollow hinged door fastened to the canopy and resting on the ledge. The door includes a transparent bottom panel and a removable top panel with a lighting fixture mounted on the top panel and positioned so that it illuminates the interior of the tank. The door can be opened for tasks such as cleaning the tank. The described configuration isolates the light fixture from the tank such that changing of the bulb or tube or servicing of the light fixture may be accomplished with minimum danger of electrical shocks from contact with water in the tank. A smaller port on one side of the canopy provides ready access to the tanks for feeding the fish.

17 Claims, 5 Drawing Sheets

AQUARIUM WITH LIGHT FIXTURE ISOLATED FROM TANK

BACKGROUND

This invention relates to small aquariums such as would be used in a home or office. Applicant has been in the business of designing and selling aquariums for many years and has observed that there are a number of disadvantages to the usual small aquarium. One such problem is that when the tank has a top covering a substantial part of the surface of the water, minerals in the water tend, over time, to become deposited on the lower surface of the top as a result of condensation. This, of course is unsightly and interferes with viewing fish in the tank from the top.

Since most such tanks are sold with glass sides and bottom and the parts sealed together, one purchasing the tank usually has no practical choice but to hang the filter on the side of the tank, part of which extends into the water. Many owners would prefer to place the tank on a stand with the filter concealed in the stand under the tank. Where the tank has a glass bottom panel, it is beyond the capability of the average owner to drill and seal holes in the glass bottom for connection of pipes or hoses to a filter.

Most such aquariums include some lamp or lighting means to illuminate the tank so that fish in the tank and their movements are readily visible. Such lighting means is preferably of relatively low wattage rating to minimize power consumption and to avoid generating excessive heat. It therefore should be placed reasonably close to the surface of the water in the tank. This creates a risk that the electrical connections may be shorted as a result of contact with water in the tank or that the bulbs or lenses may become coated with minerals from direct contact with water or from condensation. There is also concern about possible liability claims which could result from people attempting to change a lamp or otherwise work with a lighting fixture and who might receive electrical burns or shocks or other injury as a result of the fixture coming into contact with the water in the tank.

SUMMARY OF THE INVENTION

Applicant has devised an aquarium which overcomes, for the most part, the above disadvantages of conventional tank designs. Applicant's tank has a bottom panel of plastic material which may easily be drilled and sealed to provide a means of connecting a filter structure under the tank, if desired. Whether or not the owner chooses to mount the filter under the tank, the bottom panel is light, strong enough to easily carry the load of water even if only partially supported, and is easily sealed to the sidewall or walls of the tank.

The aquarium of the present invention utilizes a molded plastic top or canopy which is specifically designed to overcome many of the above problems. The canopy includes a collar which fits over the top edges of the glass sidewalls and is sealed thereto. In one modification the sides of the canopy are slanted upward and inward toward the rim of a well having a smaller area than the top of the tank. Other embodiments employ sides which are curved upward and inward or with vertical sides intersecting a flat top. The well includes vertical sides ending in a horizontal flange. In the well is a door having a top, bottom, and sides which are approximately the height of the sides of the well. Sealed in the bottom of the door is a transparent panel. A removable top panel of the door has mounted thereon a light fixture arranged such that its light shines through the transparent panel to illuminate the tank. The door is preferably hinged to the ends (short sides) of the well such that it may be pivoted to a position giving access to the interior of the tank for major tasks such as cleaning the tank. A smaller port on one side of the canopy provides ready access to the tank for feeding the fish, etc. With this arrangement it will be recognized that all the electrical parts and the lamp are isolated from the water in the tank and that changing of the bulb or even the entire electrical fixture may be done with minimum danger of short circuits or shocks.

The canopy design confers a benefit which may not be immediately apparent. Water vapor from the tank tends to condense on the bottom of the canopy structure and the water runs or drops along the vertical walls of the well and directly back into the tank, carrying such mineral content as it has with it. Thus there is a minimum build-up of mineral on the bottom of the canopy. There may be some condensation on the lower side of the transparent panel, which is easily wiped off by pivoting the door without disturbing the light fixture.

DESCRIPTION OF PREFERRED EMBODIMENTS

Figure 1:
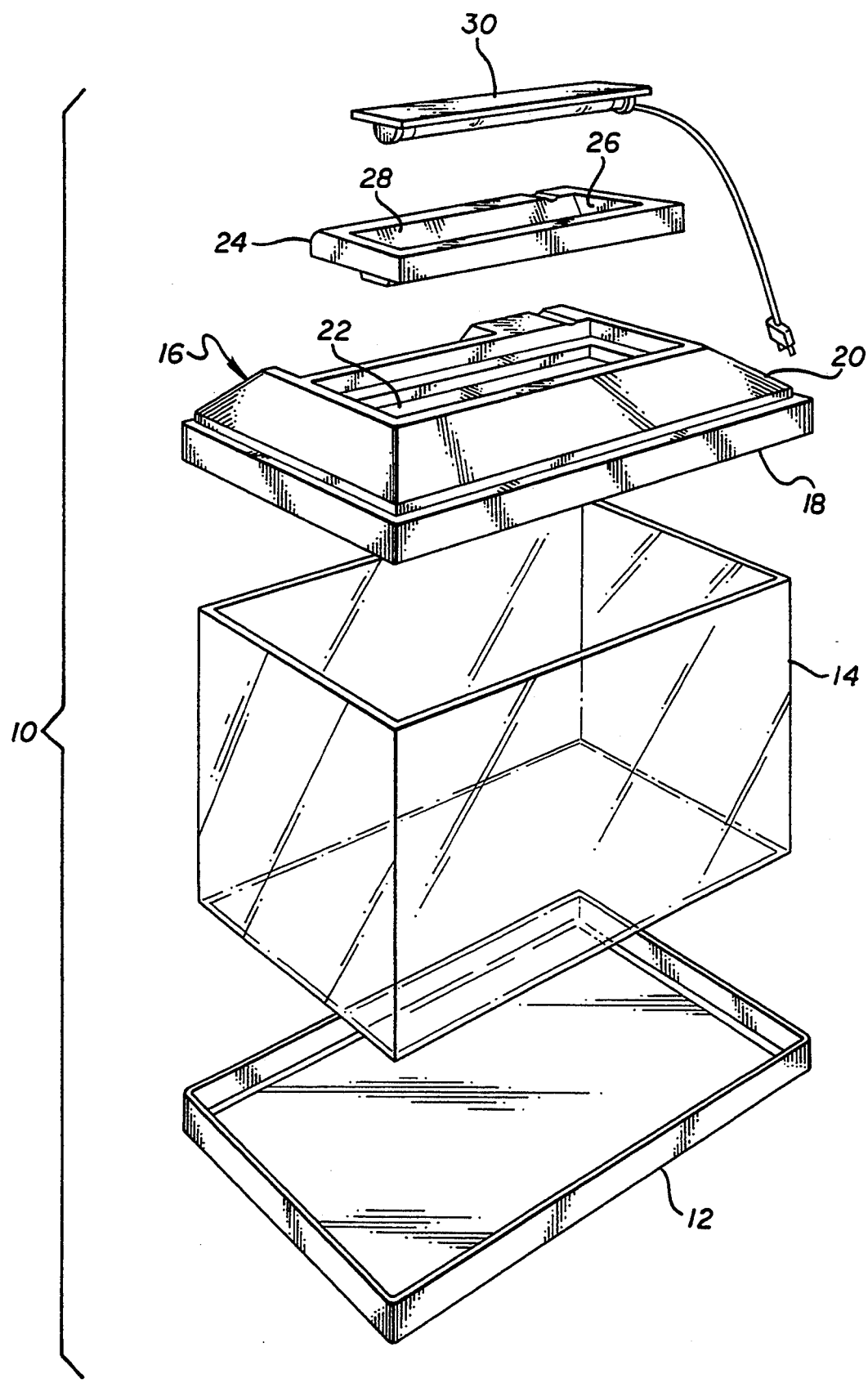
FIG. 1 is an exploded view of an aquarium according to my invention.

Referring now to FIG. 1 which is an exploded view of an aquarium according to my invention, the aquarium 10 includes a base 12 which is of opaque plastic material such as ABS plastic. Fitting into this base is a glass box 14 having two sides and two ends which fit into and are sealed to the base 12. Fitting over the top of glass box 14 is a canopy 16 having a collar with downwardly depending flanges 18 which are sealed to the box 14. Canopy 16 has an inwardly extending panels 20 on three sides terminating in a downwardly depending wall discussed below. The fourth side is somewhat different in that although it includes a partial inwardly extending panel it also provides an opening extending over most of its length.

Fitting in the opening 22 formed by the downwardly depending portions of the canopy is a door 24 which has significant depth and which is in the form of flat box having an internal chamber 26. At the bottom of chamber 26 is a transparent panel 28. Overlying the top of door 24 and serving as a top closure member is a top member 30.

Figure 2:
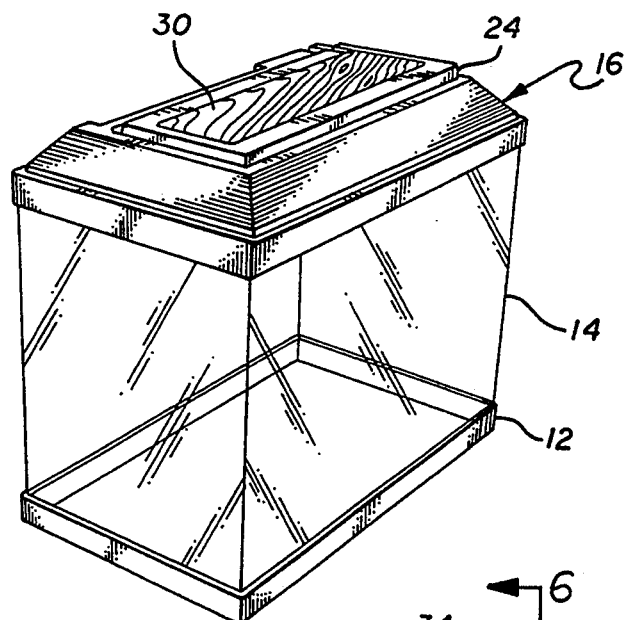
FIG. 2 is a perspective view of the aquarium of FIG. 1 as assembled.

FIG. 2 shows a perspective view of the aquarium of FIG. 1 in assembled condition with the glass box portion 14 affixed to the base 12 and the canopy 16 similarly fastened and sealed to the glass box portion 14. This view shows the door 24 installed in the canopy with the top 30 similarly installed.

Figure 3:
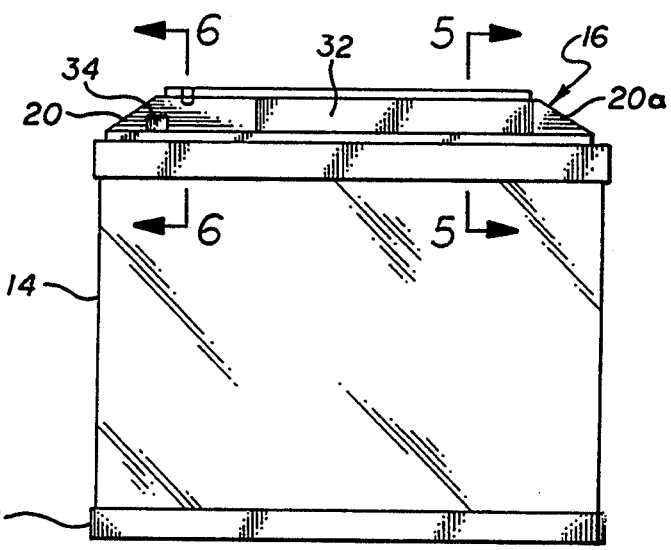
FIG. 3 is a rear elevational view of the aquarium of FIGS. 1 and 2.

FIG. 3 is a rear elevational view of the aquarium of FIGS. 1 and 2 showing the base 12, the glass box section 14 and the canopy 16. In this view of the rear side of the aquarium the inwardly slanting panel 20 extends only about ⅓ of the way across the front of the canopy 16. A similar inwardly directed panel 20a appears in the opposite corner of the canopy and between panels 20 and 20a is an opening not visible in this view but indicated by a vertical panel 32. Molded into the canopy 16 is a small molded well 34 which allows for a space at the inside edge of the glass box 14 for a small hole to receive a pipe from a filter.

Figure 4:
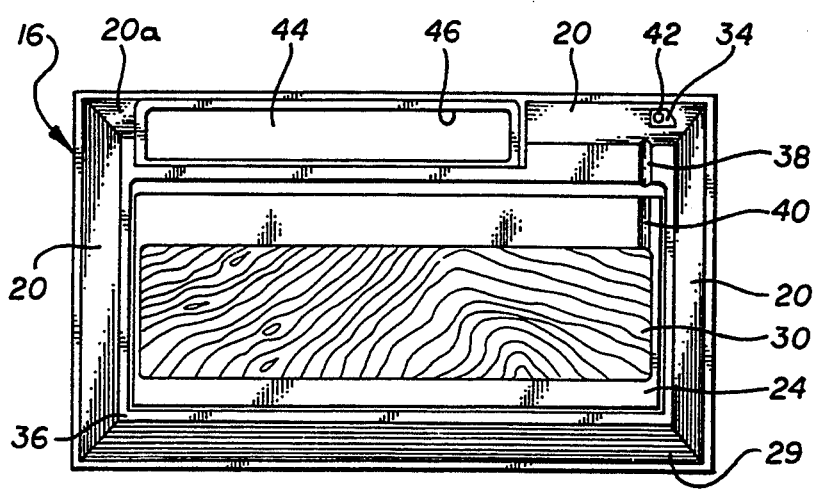
FIG. 4 is a top plan view of the aquarium of FIGS. 1, 2 and 3.

FIG. 4 is a top plan view of the aquarium and shows only the canopy 16 with its associated members. The inwardly slanting panels 20 and 20a are shown in this view each of which terminates at the top in a lip 36 which surrounds the door 24. Also shown in this view is the top member 30. Molded into the canopy member 16 the door 24 are grooves 38 and 40, respectively, which are for the purpose of accommodating an electrical cord connected to a lamp mounted on the lower side of top member 30 which will be discussed below. Also visible in this view is the small molded well 34 which provides access to a port 42 through which a filter pipe may be installed. Interrupting inwardly slanting portions 20 and 20a on the rear of canopy 16 is a large rectangular opening 44 surrounded by a narrow horizontal ledge 46.

Figure 5:
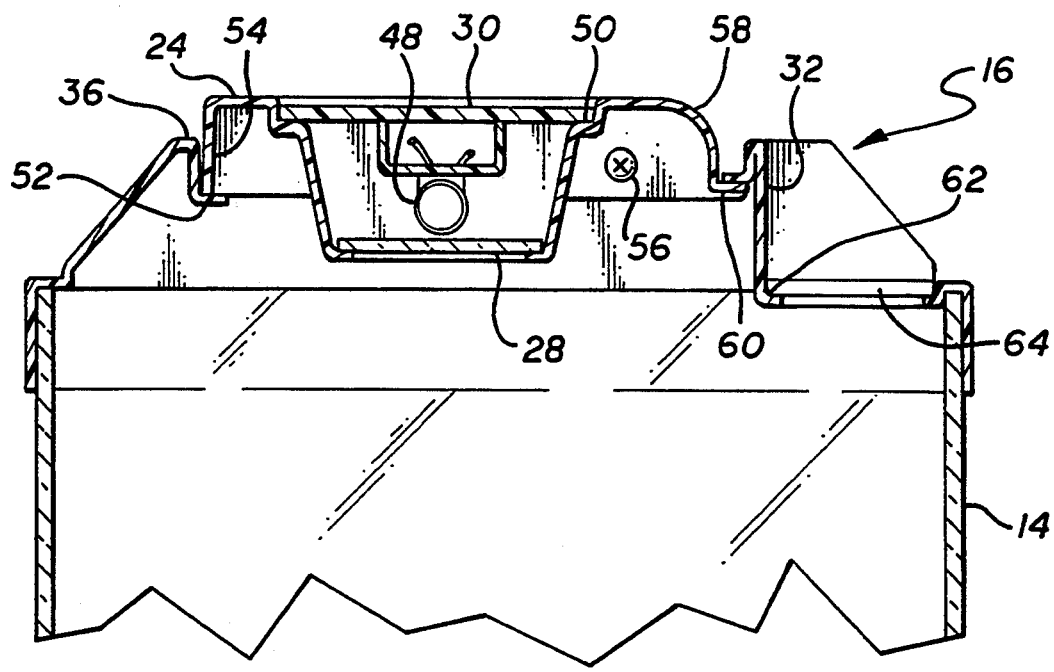
FIG. 5 is a sectional view taken along line 5—5 of FIG. 3.

FIG. 5 is a sectional view taken along line 5—5 of FIG. 3 and in this view it will be seen that top member 30 has mounted thereto a lamp fixture 48. Top member 30 is supported on a ledge 50 molded around the top of the door 24. At the bottom of the chamber 26 on the inside of door 24 is a transparent panel 28 arranged so that light from lamp 48 will shine through the panel 28 into the aquarium. The door 24 has along one side a downwardly depending edge 54 which rests on a ledge 52. Door 24 pivots around pins 56, 56a fastened to the side of the canopy at each end of the door and includes a downwardly depending member 58 having a flange 60 which limits the travel of door 24 by abutting against ledge 52. As shown in FIG. 3, the canopy 16 includes a vertical panel 32 terminating in a small ridge 62 forming the periphery of an opening 64 providing access to the tank for feeding the fish.

Figure 6:
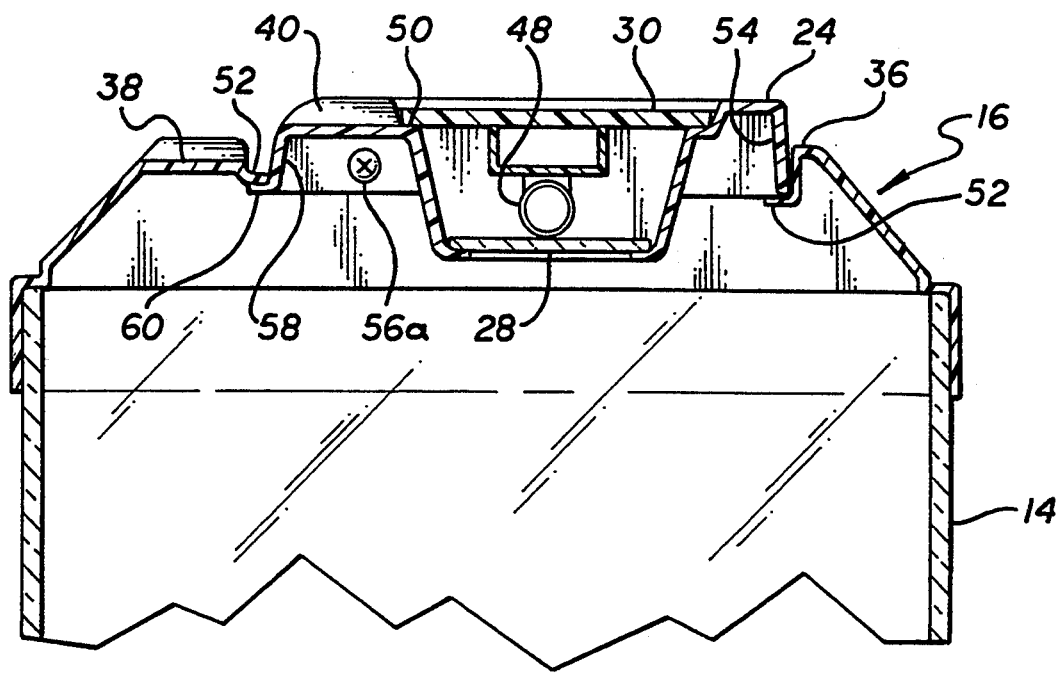
FIG. 6 is a sectional view taken along line 6—6 of FIG. 3.

FIG. 6 is a sectional view taken along line 6—6 of FIG. 3. In this view are seen a part of glass box 14, the canopy 16, and door 24 with its transparent panel 28, top member 30 and lamp 48 fastened to the top member 30. Also shown is the downwardly depending flange 54 resting on ledge 52. As shown on FIG. 4, this sectional view shows grooves 38 and 40 molded into the canopy 16 and the door 24, respectively. Door 24 is pivoted at a pin 56a.

Figure 7:
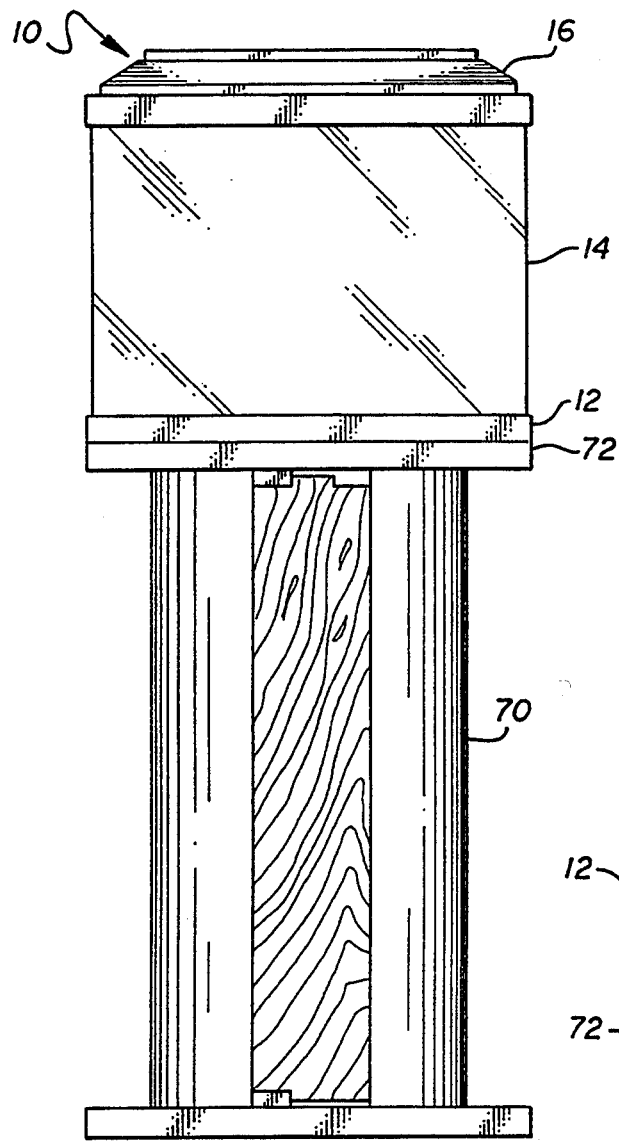
FIG. 7 is a front elevational view of the aquarium of FIG. 1-6 supported on a base.
Figure 8:
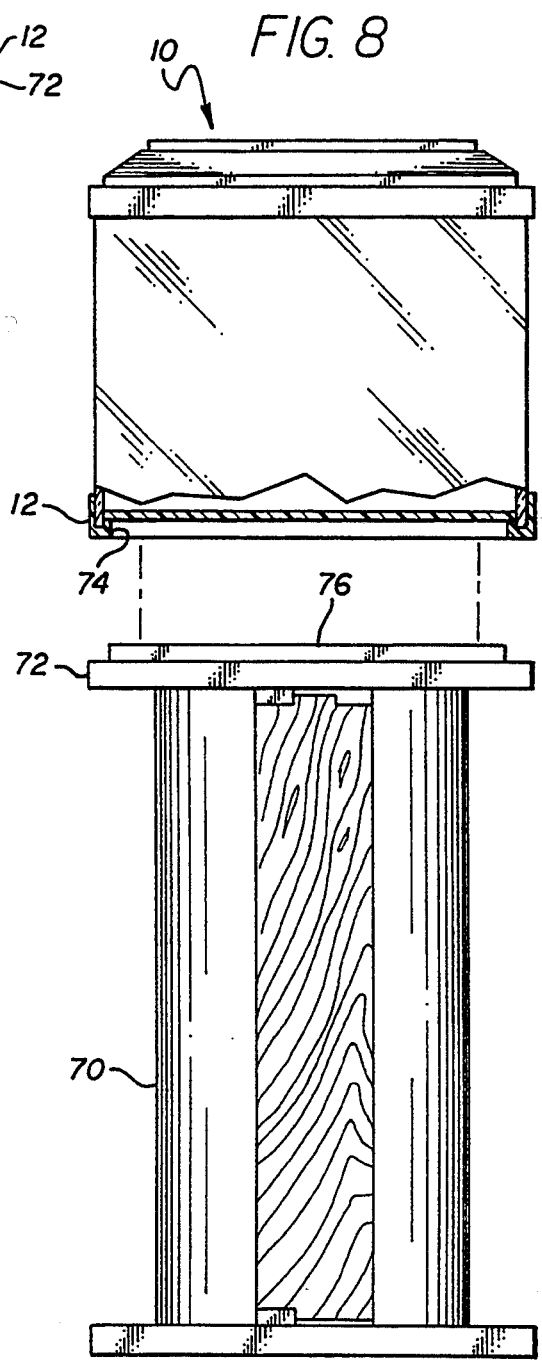
FIG. 8 is a front elevational view similar to FIG. 7 but with the aquarium shown lifted above the base and partially cut away.

FIG. 7 is a front elevational view of the aquarium of FIGS. 1-6 mounted on a pedestal 70. This pedestal includes a hollow interior capable of containing a filter mechanism while keeping it out of sight. The top of pedestal 70 includes a plate 72 which supports the aquarium 10 over the entire area of its base 12 and includes a simple interlocking means for inhibiting any possible movement of the aquarium toward the front, back or side. This interlocking means is more clearly shown in FIG. 8 in which the aquarium 10 is shown raised off the pedestal 70. This view shows part of aquarium 10 cut away with base 12 shown in section. Base 12 has a downwardly depending lip 74 which fits over a center raised portion 76 of plate 72 which secures the aquarium 10 from lateral movement relative to plate 72.

Figure 9:
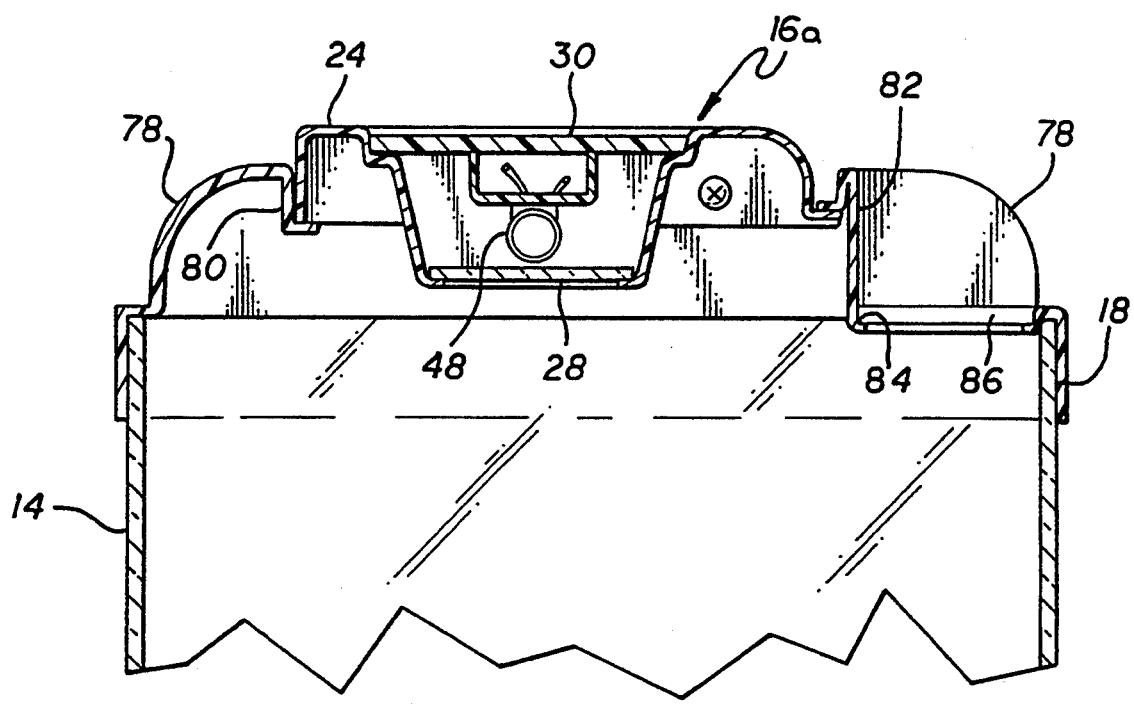
FIG. 9 is a sectional view similar to FIG. 5 but showing a modified canopy structure.

FIG. 9 is a sectional view of another embodiment of the invention and is very similar to FIG. 5 except for showing a modified canopy structure. In this view a canopy 16a having downwardly depending flanges 18 is fastened to the glass box 14 as described above. The sides of the canopy 16a, rather than having inwardly extending flat panels 20 as shown in FIG. 5, have curved panels 78 which extend upwardly and inwardly terminating in downwardly depending walls 80 which define an opening for receiving door 24. This door 24 is, or may be, identical in all of the embodiments. As set forth above, door 24 includes a transparent panel 28. A lamp 48 is carried on the bottom side of a top member 30. This embodiment also includes a vertical panel 82 terminating in a small ledge 84 which defines the edges of an opening 86, essentially the same as opening 64. At each end of opening 86 are curved wall sections 78.

Figure 10:
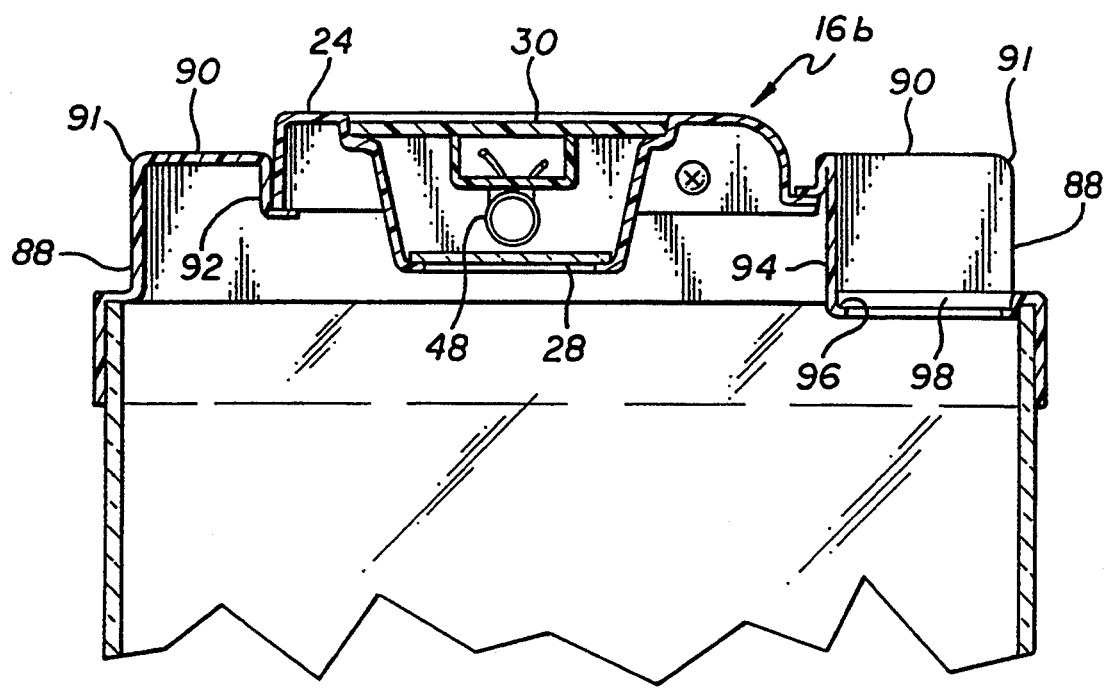
FIG. 10 is a sectional view similar to FIG. 5 but showing another modified canopy structure.

The embodiment of FIG. 10 is similar to that of FIGS. 5 and 9 except that the canopy structure 16b is modified such that, rather than having inwardly slanted panels 20 or curved panels 78, it has essentially vertical side panels 88 which join with horizontal top panels 90 in a curved junction 91. At the inside of top panels 90 are downwardly depending walls 92 which form a well for receiving the door 24, which includes top 30 to which is fastened light fixture 48 located such that its light illuminates the tank through transparent panel 28. A vertical panel 94 fixture 48 located such that its light illuminates the tank through transparent panel 28. A vertical panel 94 terminates in a small ledge 96 defining the edges of an opening 98. At each end of opening 98 are shorter sections of vertical side panels 88 and top panels 90.

While only a limited number of embodiments have been shown and described herein, modifications may be made within the scope of the present invention and I do not desire to be limited other than by the following claims and their equivalents.

I claim:

1. An aquarium including a tank, a canopy forming a top for said tank, an opening in the center of said canopy with a vertical wall defining a well, a narrow ledge at the bottom of said well, a hollow hinged door member normally resting on said ledge and pivotable to provide access to said tank, said door member having a sidewall, a transparent bottom panel sealed to said sidewall, a removable top panel, and lighting means fastened to said top panel for directing light through said transparent panel into said tank.

2. An aquarium as claimed in claim 1 wherein said tank includes a plurality of sidewalls of transparent material and a bottom of plastic material sealed to said sidewalls.

3. An aquarium as claimed in claim 1 wherein said canopy is formed of molded plastic material.

4. An aquarium as claimed in claim 3 wherein said canopy includes sidewalls which are generally tapered upwardly and inwardly toward said opening.

5. An aquarium as claimed in claim 4 wherein the sides of said canopy are generally trapezoidal in shape with one sidewall including an opening providing access to said tank.

6. An aquarium as claimed in claim 4 wherein said canopy includes a narrow ledge at the bottom of said well and said door includes a downwardly depending wall resting on said ledge.

7. An aquarium as claimed in claim 6 wherein said door includes a second downwardly depending wall having a horizontal flange located under said narrow ledge to limit travel of said door.

8. An aquarium as claimed in claim 3 wherein said canopy has sidewalls curving upwardly and inwardly toward said opening.

9. An aquarium as claimed in claim 8 wherein said canopy includes a narrow ledge at the bottom of said well and said door includes a downwardly depending wall resting on said ledge.

10. An aquarium as claimed in claim 9 wherein said door includes a second downwardly depending wall having a horizontal flange located under said narrow ledge to limit travel of said door.

11. An aquarium as claimed in claim 3 wherein said canopy includes vertical side panels and horizontally extending top panels joining said side panels in a curved junction, said top panels extending inwardly toward said opening.

12. An aquarium as claimed in claim 11 wherein said canopy includes a narrow ledge at the bottom of said well and said door includes a downwardly depending wall resting on said ledge.

13. An aquarium as claimed in claim 12 wherein said door includes a second downwardly depending wall having a horizontal flange located under said narrow ledge to limit travel of said door.

14. An aquarium with sidewalls of transparent material, a bottom sealed to said sidewalls, a canopy forming a top for said aquarium sealed to said sidewalls, said canopy having sides which are generally tapered upwardly and toward its center, an opening in the center of said canopy with vertical walls defining a well, a hinged door in said well and a transparent panel in said door at the bottom of said well, a removable cover panel for said door, and lighting means fastened to said cover panel for directing light into said aquarium.

15. An aquarium as claimed in claim 14 wherein said sides of said canopy are generally trapezoidal in shape with one sidewall including an opening providing access to said tank.

16. An aquarium as claimed in claim 14 wherein said canopy includes a molded well adjacent one of said sidewalls and a port at the bottom of said well.

17. An aquarium as claimed in claim 14 wherein an electric cord is connected to said lighting means, and said canopy and said door each have aligned grooves for accommodating said electrical cord.

* * * * *